(12) United States Patent
Chang

(10) Patent No.: US 11,503,248 B1
(45) Date of Patent: Nov. 15, 2022

(54) METHOD OF MEMC AND RELATED VIDEO PROCESSOR

(71) Applicant: NOVATEK Microelectronics Corp., Hsin-Chu (TW)

(72) Inventor: Hsiao-En Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/567,904

(22) Filed: Jan. 4, 2022

(51) Int. Cl.
*H04N 7/01* (2006.01)
*G06T 7/215* (2017.01)

(52) U.S. Cl.
CPC ........... *H04N 7/0147* (2013.01); *G06T 7/215* (2017.01); *H04N 7/013* (2013.01); *H04N 7/014* (2013.01); *G06T 2207/10016* (2013.01); *G06T 2207/20021* (2013.01)

(58) Field of Classification Search
CPC .... H04N 7/014; H04N 7/0125; H04N 7/0135; H04N 7/0137; H04N 7/0127; H04N 7/0147; H04N 7/01; H04N 7/013; H04N 7/0145; H04N 7/0142; G06T 2207/10016; G06T 2207/20021; G06T 7/215

USPC ....... 348/441, 448, 451, 452, 458, 459, 699, 348/701
See application file for complete search history.

(56) References Cited

U.S. PATENT DOCUMENTS

| | | | |
|---|---|---|---|
| 8,494,058 B2 * | 7/2013 | Chang .................... | H04N 19/51 348/452 |
| 2012/0140119 A1 * | 6/2012 | Chang .................. | H04N 7/0115 348/E5.062 |

* cited by examiner

*Primary Examiner* — Sherrie Hsia
(74) *Attorney, Agent, or Firm* — Winston Hsu

(57) ABSTRACT

A motion estimation method for a video processor includes steps of: calculating frame difference between a current input frame and a previous input frame; comparing the frame difference and a threshold to generate a comparison result; if the comparison result indicates the frame difference less than the threshold, determining whether a first block of the current input frame is a mixed block according to a block difference that indicates a difference between the first block and a block of the previous input frame at the same position; generating at least one temporal motion vector candidate for the first block; modifying the temporal motion vector candidate according to a current position difference value of video part in the current input frame when the first block is determined as the mixed block; and determining a motion vector for the first block from multiple motion vector candidates including the temporal motion vector candidate.

24 Claims, 9 Drawing Sheets

METHOD OF MEMC AND RELATED VIDEO PROCESSOR

BACKGROUND OF THE INVENTION

1. Field of the Invention

The present invention relates to a method of motion estimation and motion compensation (MEMO) and a related video processor, and more particularly, to a method of MEMO for a video processor having mixed image content.

2. Description of the Prior Art

Motion estimation and motion compensation (MEMO) is a technology using frame interpolation, which allows a series of image frames to be displayed with a higher frame rate. For example, if a 30 Hz source video such as a film is required to be displayed in 60 Hz, an interpolated frame should be added between every two consecutive input frames in the source video, so as to double the frame rate.

Supposing that the frame rate of a source video from a video provider is 24 Hz and the image to be shown on the display panel is 60 Hz, every two input frames are converted into five output frames through a frame conversion technique. In order to prevent judders appearing on the output image, a cadence specifying the film mode 32 is used to perform the interpolation, where two input frames are incorporated to generate at least one interpolated frame. The MEMO operation allows the video processor to select appropriate input frames and apply a correct phase coefficient to perform interpolation, allowing the output image to be smooth.

However, if the video provider provides a mixed-mode video sequence composed of a film part and a video part such as a scrolling text video appearing in a lower bar or a side bar of a screen, or a pop-up text video on the film part, the conventional MEMO operation may not deal with both the video part and the film part. In general, the MEMO merely deals with the video part, which results in judders on the film part. Thus, there is a need for improvement over the prior art.

SUMMARY OF THE INVENTION

It is therefore an objective of the present invention to provide a novel motion estimation and motion compensation (MEMO) method and a video processor capable of dealing with the mixed-mode video, in order to solve the above-mentioned problems.

An embodiment of the present invention discloses a method of motion estimation for a video processor. The method comprises steps of: receiving a current input frame comprising a film part and a video part; calculating a frame difference between the current input frame and a previous input frame which is previous to the current input frame; comparing the frame difference and a first threshold to generate a comparison result; in response to that the comparison result indicates the frame difference is less than the first threshold, determining whether a first block among a plurality of blocks of the current input frame is a mixed block according to a block difference with respect to the first block, wherein the block difference indicates a difference between the first block of the current input frame and a block of the previous input frame at the same position as the first block; generating at least one temporal motion vector candidate for the first block; modifying the at least one temporal motion vector candidate for the first block according to a current position difference value of the video part in the current input frame when the first block is determined to be the mixed block; and determining a motion vector for the first block from a plurality of motion vector candidates which comprise the at least one temporal motion vector candidate.

Another embodiment of the present invention discloses a video processor, which is configured to perform the following steps: receiving a current input frame comprising a film part and a video part; calculating a frame difference between the current input frame and a previous input frame which is previous to the current input frame; comparing the frame difference and a first threshold to generate a comparison result; in response to that the comparison result indicates the frame difference is less than the first threshold, determining whether a first block among a plurality of blocks of the current input frame is a mixed block according to a block difference with respect to the first block, wherein the block difference indicates a difference between the first block of the current input frame and a block of the previous input frame at the same position as the first block; generating at least one temporal motion vector candidate for the first block; modifying the at least one temporal motion vector candidate for the first block according to a current position difference value of the video part in the current input frame when the first block is determined to be the mixed block; and determining a motion vector for the first block from a plurality of motion vector candidates which comprise the at least one temporal motion vector candidate.

Another embodiment of the present invention discloses a method of motion compensation for a video processor. The method comprises steps of: receiving a current input frame comprising a film part and a video part; determining whether a first block among a plurality of blocks of the current input frame is a mixed block according to a block difference with respect to the first block, wherein the block difference indicates a difference between the first block of the current input frame and a block of a previous input frame at the same position as the first block; in a case that the first block is determined to be a mixed block, generating a phase coefficient for the first block according to a ratio of a first position difference value to a second position difference value, wherein the first position difference value is a difference between a position of a video part in an interpolated frame and a position of a video part in the previous input frame, and the second position difference value is a difference between a position of the video part in the current input frame and the position of the video part in the previous input frame; and generating the interpolated frame based on the current input frame and the previous input frame by using the phase coefficient, wherein a block of the interpolated frame is generated based on the first block of the current input frame and a second block of the previous input frame indicated by a motion vector of the first block of the current input frame by using the phase coefficient.

Another embodiment of the present invention discloses a video processor, which is configured to perform the following steps: receiving a current input frame comprising a film part and a video part; determining whether a first block among a plurality of blocks of the current input frame is a mixed block according to a block difference with respect to the first block, wherein the block difference indicates a difference between the first block of the current input frame and a block of a previous input frame at the same position as the first block; in a case that the first block is determined to be a mixed block, generating a phase coefficient for the first block according to a ratio of a first position difference value to a second position difference value, wherein the first position difference value is a difference between a position of a video part in an interpolated frame and a position of a video part in the previous input frame, and the second position difference value is a difference between a position of the video part in the current input frame and the position of the video part in the previous input frame; and generating the interpolated frame based on the current input frame and the previous input frame by using the phase coefficient, wherein a block of the interpolated frame is generated based on the first block of the current input frame and a second block of the previous input frame indicated by a motion vector of the first block of the current input frame by using the phase coefficient.

These and other objectives of the present invention will no doubt become obvious to those of ordinary skill in the art after reading the following detailed description of the preferred embodiment that is illustrated in the various figures and drawings.

DETAILED DESCRIPTION

The video processor of the present invention may receive a series of input frames (of a source video) from a video provider, perform motion estimation and motion compensation (MEMO) on the input frames to generate interpolated frames, and then output a series of output frames including the interpolated frames. As mentioned above, each image frame received from the video provider in the mixed mode may include a video part and a film part. The film part refers to a background film, and the video part may be the scrolling text video, pop-up text video, dialog box, or any other image object overlapping the film. Supposing that the original frame rate of the source video is 24 Hz and the frame rate is requested to be converted into 60 Hz, 3:2 pull-down may be applied to generate the film part in a series of input frames. The image content of the film part in the series of input frames may be represented as A, A, A, B, B, C, C, C, D, D . . . , where the three input frames A are similar to each other, the two input frames B are similar to each other, and so on.

In addition, in the mixed mode, the input frames are mixed with the video part. In general, the video part may be incorporated into a series of input frames after the 3:2 pull-down is performed. This video part is usually generated in a 60 Hz frame rate; hence, the image contents in the video part of different input frames are different from each other, which may be represented as a, b, c, d, e . . . , etc.

Figure 1:
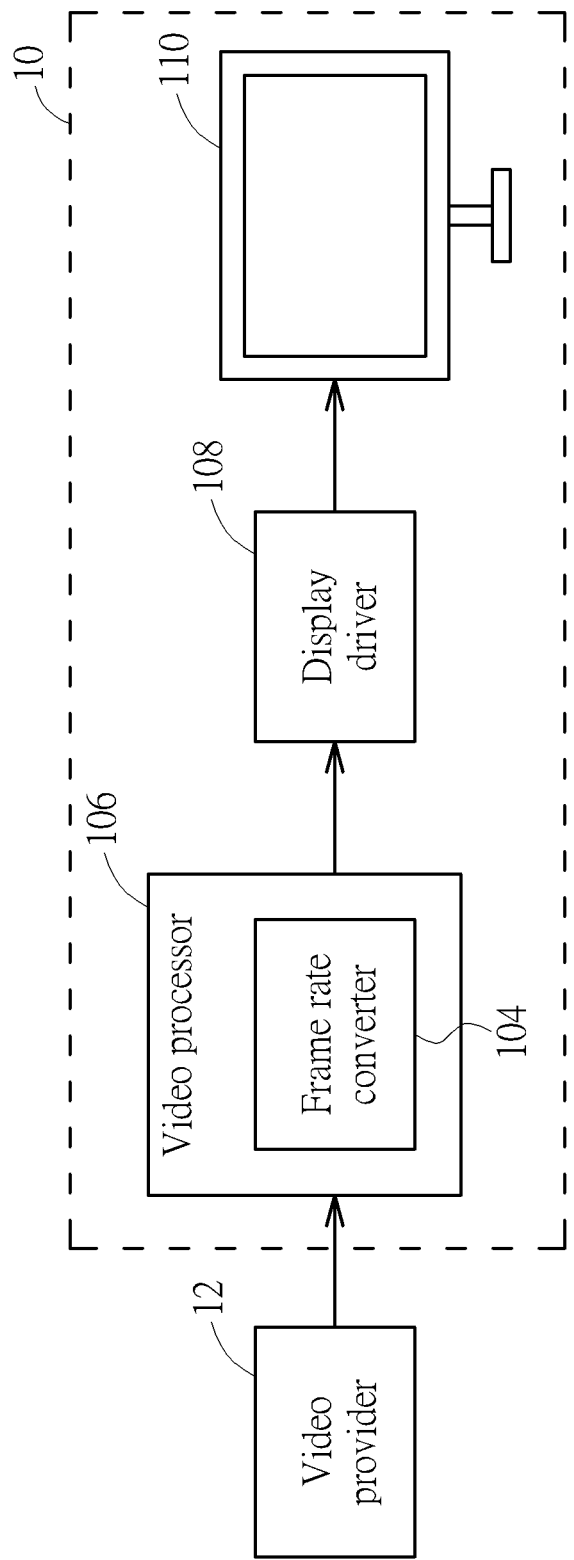
FIG. 1 is a schematic diagram of a display system according to an embodiment of the present invention.

Please refer to FIG. 1, which is a schematic diagram of a display system 10 according to an embodiment of the present invention. As shown in FIG. 1, the display system 10 such as a TV may receive and display a source video having a series of image frames provided by a video provider 12 such as a DVD player or a video streaming service provider communicated with the display system 10 via a wired network or a wireless network. The display system 10 includes a video processor 106, a display driver 108 and a display panel 110. In general, the frame rate of the source video may not be the same as the frame rate to be displayed on the display panel 110. The video processor 106 may include a TV controller integrated circuit (IC) and a frame rate conversion (FRC) IC for converting the source video which usually has a lower frame rate to generate a series of output frames of a higher frame rate to be displayed by the display panel 110. Or, the video processor 106 may be a TV controller IC embedded with a function of FRC. That is, the frame rate converter 104 depicted in FIG. 1 can be regarded as the stand-alone FRC IC or the internal FRC circuit inside the TV controller IC. For example, when receiving a 24-Hz input video having two input frames A and B, the frame rate converter 104 may convert the 2 input frames A and B into 5 image frames A, A, A, B, B in 60 Hz. These image frames may be served as the film part to be combined with the video part, and the video processor 106 may perform MEMC operations to generate appropriate interpolated frames based on these image frames.

The display driver 108 may convert the image data into data voltage signals and drive the display panel 110 to display the image frames through the data voltage signals. The display driver 108 may include a timing controller, a source driver, a gate driver, and/or any other devices capable of driving the display panel 110. The display panel 110 may be of any type such as a liquid crystal display (LCD) panel, light-emitting diode (LED) display, and plasma display panel (PDP), but not limited thereto.

Figure 2:
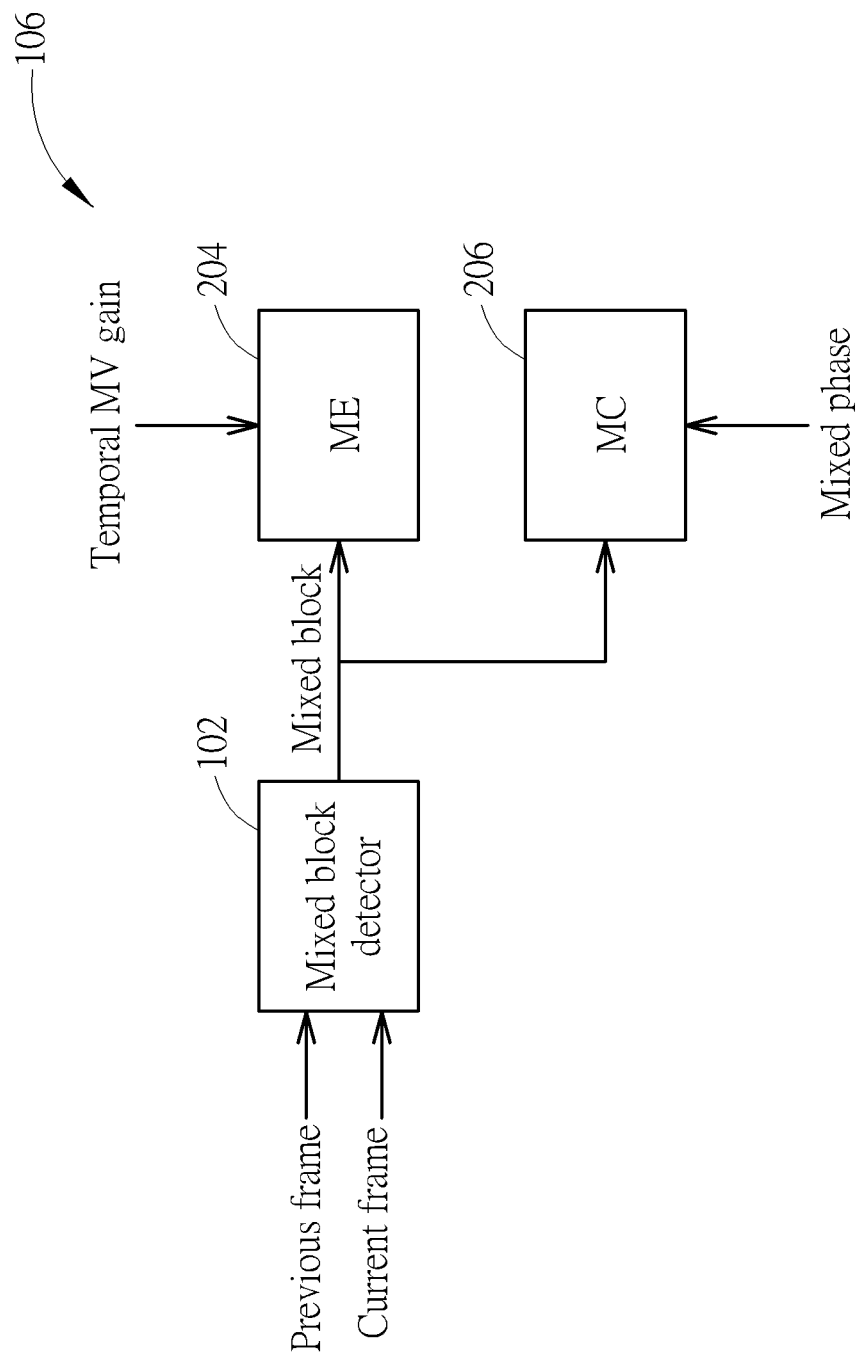
FIG. 2 illustrates a detailed implementation of the video processor shown in FIG. 1.

The video processor 106 is configured to perform the MEMC operations to generate the interpolated frames and make the series of output frames smooth. FIG. 2 illustrates a detailed implementation of the video processor 106. As shown in FIG. 2, the video processor 106 includes a mixed block detector 202, a motion estimation (ME) unit 204 and a motion compensation (MC) unit 206. The mixed block detector 202, the ME unit 204 and the MC unit 206 may be parts of the frame rate converter 104 whatever it is a stand-alone IC or an internal circuit.

The MEMC is usually a block-based operation. In order to process the mixed-mode image frame appropriately, the video processor 106 should determine whether each image block is a mixed block containing image content of the video part. In detail, the mixed block detector 202 may determine whether each image block is a mixed block, and output the determination result to the ME unit 204 and the MC unit 206. In the ME procedure, the ME unit 204 may find out the best motion vector (MV) for each block in the input frame from a plurality of MV candidates, where the MV candidates include one or more temporal MV candidates and/or one or more spatial MV candidates, but not limited thereto. If an image block is determined to be the mixed block, the ME unit 204 may apply a gain to the temporal MV candidate(s) for this mixed block, and select the best MV for this mixed block from the MV candidates after the temporal MV candidate(s) is modified based on the gain.

In the MC procedure, the MC unit 206 may generate the interpolated frame based on the selected MV for each block. A phase coefficient is applied to generate each interpolated frame. In general, the regular phase coefficients used for interpolation may be determined based on the cadence of the input frames and the input/output frame rates, and may have equal phase steps. For example, if the output frame rate is the same as the input frame rate and the cadence indicates the film mode 32, the regular phase coefficients will be 0 (i.e., 1*A+0*B), 2/5 (i.e., (3/5)*A+(2/5)*B), 4/5 (i.e., (1/5)*A+(4/5)*B), 1/5 (i.e., (4/5)*B+(1/5)*C) and 3/5 (i.e., (2/5)*B+(3/5)*C) in series. If an image block is determined to be the mixed block, the MC unit 206 may apply mixed phase coefficients other than the regular phase coefficients to generate the interpolated frames, where one or several of the mixed phase coefficients may be different from the corresponding regular phase coefficients.

Otherwise, if an image block is determined to be not a mixed block, the temporal MV candidate(s) of this image block may not be modified in the ME unit 204, and the MC unit 206 will apply the regular phase coefficients having equal phase steps to generate the interpolated frames.

Figure 3:
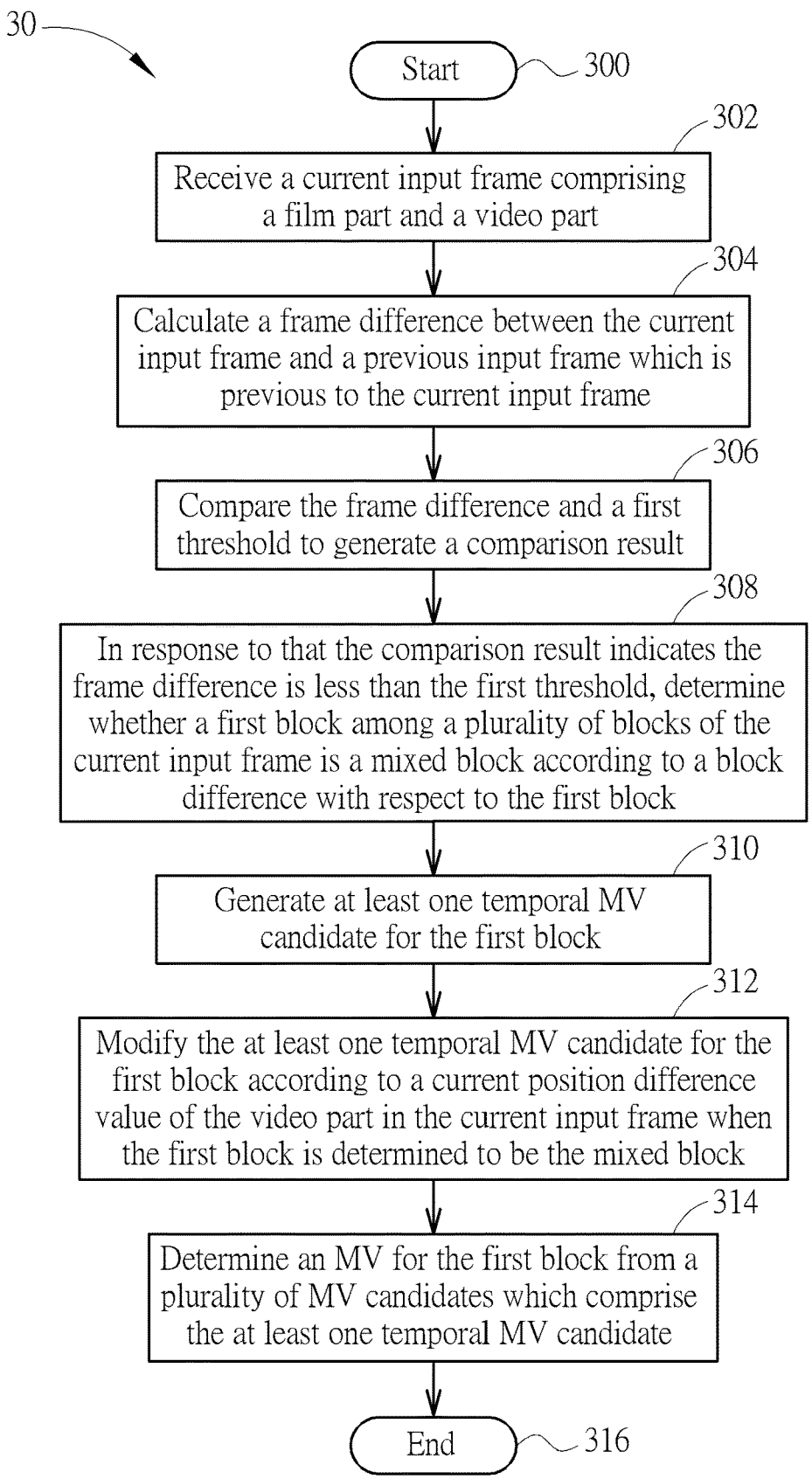
FIG. 3 is a flowchart of an image processing process according to an embodiment of the present invention.

Please refer to FIG. 3, which is a flowchart of an image processing process 30 according to an embodiment of the present invention. The image processing process 30 may be implemented in a video processor, such as the video processor 106 shown in FIGS. 1 and 2. As shown in FIG. 3, the image processing process 30 includes the following steps:

Step 300: Start.

Step 302: Receive a current input frame comprising a film part and a video part.

Step 304: Calculate a frame difference between the current input frame and a previous input frame which is previous to the current input frame.

Step 306: Compare the frame difference and a first threshold to generate a comparison result.

Step 308: In response to that the comparison result indicates the frame difference is less than the first threshold, determine whether a first block among a plurality of blocks of the current input frame is a mixed block according to a block difference with respect to the first block.

Step 310: Generate at least one temporal MV candidate for the first block.

Step 312: Modify the at least one temporal MV candidate for the first block according to a current position difference value of the video part in the current input frame when the first block is determined to be the mixed block.

Step 314: Determine an MV for the first block from a plurality of MV candidates which comprise the at least one temporal MV candidate.

Step 316: End.

According to the image processing process 30, the video processor 106 receives the current input frame that may have a film part and a video part (Step 302), and also receives a previous input frame previous to the current input frame, where the previous input frame may also have a film part and a video part. In an embodiment, the video processor 106 may include a frame buffer used to store the image data. Alternatively, the image data of the input frames may be read out from an external frame buffer. As mentioned above, the content of the film part, which may be a background film, may follow the film mode specified by the cadence. The content of the video part, which may be a scrolling text video overlapping the film, may be different in every image frame. For example, a word string in the scrolling text video may keep moving and thus have a displacement in every input frame as compared to its previous input frame. In order to achieve a preferable image quality without unwanted judders, both the video part and the film part are taken into consideration in the MEMO procedure.

After receiving the current input frame, the video processor 106 may calculate the frame difference between the current input frame and the previous input frame (Step 304), and compare the frame difference with a threshold to generate a comparison result (Step 306). Note that the frame difference indicates the difference between the entire image frames, for determining whether the current input frame and the previous input frame belong to the same frame group. In general, similar input frames may be classified as a frame group. For example, as for 5 consecutive input frames A, A, A, B, B generated after 3:2 pull-down, the 3 input frames A are classified as a frame group, and the 2 input frames B are classified as another frame group. Therefore, if the comparison result indicates that the frame difference is greater than the threshold, the current input frame and the previous input frame may be determined to be in different frame groups. If the comparison result indicates that the frame difference is less than the threshold, the current input frame and the previous input frame may be determined to be in the same frame group.

Figure 4:
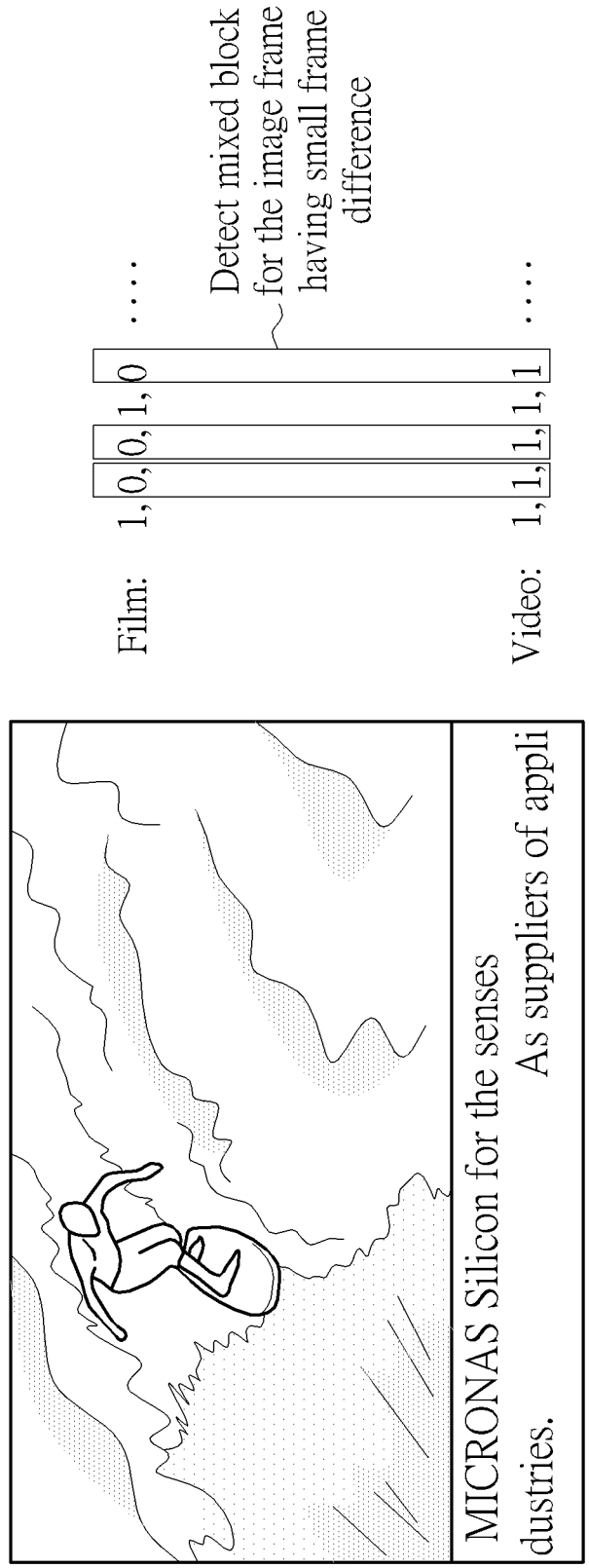
FIG. 4 is a schematic diagram of a mixed-mode image frame including a film part and a video part.

Please refer to FIG. 4, which is a schematic diagram of a mixed-mode image frame including a film part and a video part. As shown in FIG. 4, the film part refers to a picture and the video part refers to a scrolling text video in the bottom bar of the image frame. FIG. 4 also illustrates respective 1-bit (0 or 1) sequences representing whether the film part or the video part of each current frame is different enough from the film part or the video part of each previous frame, which are similar to a sequence of comparison results generated by the Step 306. FIG. 4 supposes that the film part in a series of input frames is received following the film mode 32, the film content may be represented as A, A, A, B, B, C, C, C . . . and the corresponding sequence will be 1, 0, 0, 1, 0, 1, 0, 0 . . . and so on. The bit "1" means that the film part or the video part in the current frame is different enough (i.e., the difference is large enough) from the film part or the video part in the previous frame, and the bit "0" means that the film part or the video part in the current frame is not different enough (i.e., the difference is not large enough) from the film part or the video part in the previous frame. In the same series of input frames, the video part is always different between every two consecutive input frames; hence, the sequence for the video part will be 1, 1, 1, 1 and 1. It is noted that in the image processing process 30, the frame difference and the comparison result are frame-based calculation and are not calculated based on the film part only or the video part only.

In the embodiments of the present invention, the MEMC operations are performed on blocks of the video part and blocks of the film part in different manners. Briefly, if a frame difference of a current frame is determined small enough (such as less than a threshold), the video processor 106 may differentiate whether each block in the current frame belongs to the video part (called a mixed block) based on a block difference of the each block, and the video processor 106 performs MEMO operations with special manners on blocks of the video part of this current input frame.

In general, the film part may occupy a larger area than the video part in an image frame, and the overall frame difference of an image frame is mainly determined by the frame difference of the film part. Therefore, an appropriate threshold may be set, so that the video processor 106 may determine whether each input frame has small-enough frame difference. The subsequent mixed block detection will be performed only on those input frames determined to have small frame difference.

In an embodiment, a group change flag indicating the group setting may be applied to each input frame. For example, if a current input frame is classified into a frame group different from the frame group to which the previous input frame belongs, the group change flag of the current input frame will be set to "1". If a current input frame is classified into a frame group to which the previous input frame belongs, the group change flag of the current input frame will be set to "0". In such a situation, the mixed block detection may be performed based on the group change flag. More specifically, the mixed block detection may be performed on those input frames having the group change flag value "0". The comparison result generated by Step 306 may be used to set the value of group change flag.

Therefore, when the comparison result of the frame difference indicates that the frame difference is less than the threshold, the video processor 106 will further determine whether each block is a mixed block or not according to a block difference of the each block. In other words, when determining that the frame difference is less than the threshold, the video processor 106 may know that the film part in the current input frame is similar to the film part in the previous input frame, and thereby distinguish those blocks belonging to the video part.

In an embodiment, the mixed block detector 202 of the video processor 106 may determine whether a first block of the current input frame is a mixed block according to the block difference with respect to the first block (Step 308). The block difference indicates the difference between the first block of the current input frame and a block of the previous input frame at the same position as the first block. Note that the abovementioned frame difference indicates the difference of the entire image frames, while the block difference indicates the difference of the block at a specific position between different image frames.

In detail, the mixed block detector 202 may calculate the block difference with respect to the first block by summing every difference between each pixel data of the first block of the current input frame and each corresponding pixel data of the corresponding block of the previous input frame. This corresponding block in the previous input frame is at the same position as the first block in the current input frame, and the difference of each pixel data is summed up to calculate the block difference. The mixed block detector 202 thereby determines a block mix level with respect to the first block according to the block difference.

Figure 5:
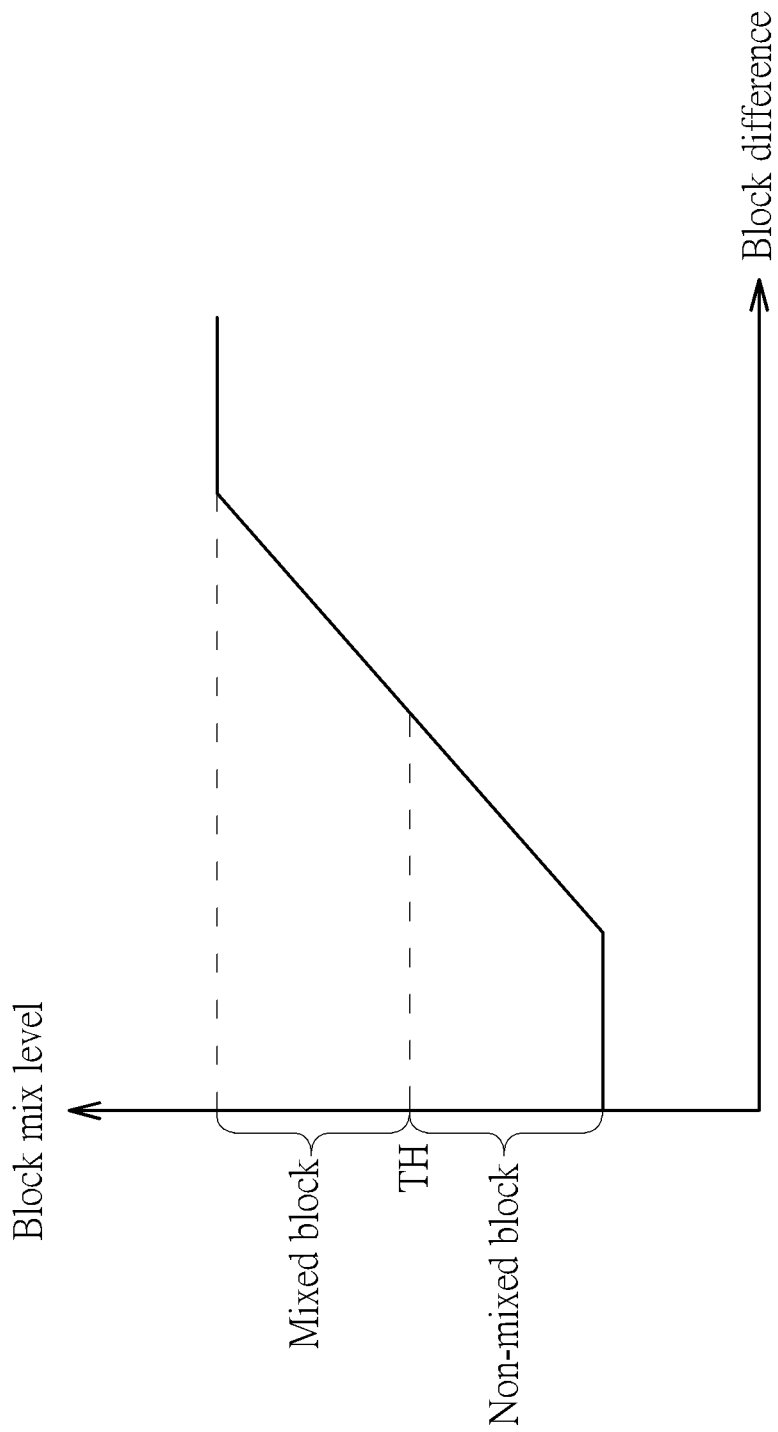
FIG. 5 is a schematic diagram of mapping the block difference to the block mix level according to an embodiment of the present invention.

Please refer to FIG. 5, which is a schematic diagram of mapping the block difference to the block mix level according to an embodiment of the present invention. As shown in FIG. 5, the block mix level is determined based on the block difference. The block mix level may have a larger value if the block difference of the image frame is larger, and may have a smaller value if the block difference of the image frame is smaller. The mixed block detector 202 may further compare the block mix level of the first block with a threshold TH to determine whether the first block is a mixed block. In detail, if the block mix level is greater than the threshold TH, the first block may be determined to be a mixed block; if the block mix level is smaller than the threshold TH, the first block may be determined to be a non-mixed block. As for the non-mixed block, the video processor 106 (or the frame rate converter 104) performs MEMO operation of a special manner different from MEMC operations performed on the mixed blocks.

Please note that the threshold TH may be set flexibly. The threshold TH may be in any level capable of differentiating the mixed block mixed with the video part and the non-mixed block having the film part only. The mixed block and the non-mixed block will apply MEMO in different manners.

After determining whether the first block is the mixed block based on the block difference, the mixed block detector 202 may output the determination result to the ME unit 204 and the MC unit 206. Therefore, the ME unit 204 may perform ME on the first block in an appropriate manner and the MC unit 206 may perform MC on the first block in an appropriate manner based on whether the first block is the mixed block.

In detail, the ME unit 204 may generate at least one temporal MV candidate for the first block (Step 310). As for the first block in the current input frame, the ME unit 204 may generate one or several MV candidates based on the block motion of the first block. If the first block takes a best MV of another block of the current input frame which is already obtained as an MV candidate, the MV candidate is a spatial MV candidate. If the block motion of the first block takes a block of the previous input frame as a reference, the generated MV candidate is a temporal MV candidate. According to the present invention, if the first block is determined to be the mixed block, the ME unit 204 may further modify at least one temporal MV candidate for the first block according to a current position difference value of the video part in the current input frame (Step 312).

In an embodiment, the temporal MV candidate(s) may be multiplied by a gain determined based on the current position difference value of the video part. More specifically, the ME unit 204 may modify the temporal MV candidate(s) by multiplying each of the temporal MV candidate(s) by a gain determined according to the current position difference value and the previous position difference value of the video part. The current position difference value is the difference value between the position of the video part in the current input frame and the position of the video part in the previous input frame with respect to a current output frame, and the previous position difference value is the difference value between the position of the video part in the current input frame and the position of the video part in the previous input frame with respect to a previous output frame previous to the current output frame.

Suppose that the video processor 106 receives an image sequence in the film mode 22. The film part of the image sequence may include a series of input frames A1, A2, B1, B2, C1, C2 . . . , where the input frames A1 and A2 belong to the same frame group and have similar image content, the input frames B1 and B2 belong to the same frame group and have similar image content, and so on. The video part may be a scrolling text video having an equal movement in each input frame; that is, the video part may move with a constant speed. To facilitate the illustration, the position of the video part may be represented by a number. For example, the image content of a series of input frames may be A1 (0), A2 (10), B1 (20), B2 (30) . . . , which contain the information of the film part and the information of the position of the video part (represented as a value).

In this embodiment, each output frame may be generated by combining one input frame as the current input frame and one input frame as the previous input frame with a phase coefficient, as shown in Table 1:

TABLE 1

| Previous input frame | Current input frame | Phase | Previous video position | Current video position | Position diff. value | Temporal MV gain |
|---|---|---|---|---|---|---|
| A2 | B1 | 0 | 10 | 20 | 10 | |
| A2 | B1 | 0.25 | 10 | 20 | 10 | 1 |
| A2 | B2 | 0.5 | 10 | 30 | 20 | 2 |
| A2 | B2 | 0.75 | 10 | 30 | 20 | 1 |
| B2 | C1 | 0 | 30 | 40 | 10 | 0.5 |
| B2 | C1 | 0.25 | 30 | 40 | 10 | 1 |
| B2 | C2 | 0.5 | 30 | 50 | 20 | 2 |
| B2 | C2 | 0.75 | 30 | 50 | 20 | 1 |

Table 1 illustrates the previous input frame and the current input frame combined to generate a series of output frames (or interpolated frames) based on the phase coefficients. The field "Previous video position" refers to the position of the video part in the previous input frame, and the field "Current video position" refers to the position of the video part in the current input frame. The position difference value is the difference between the current video position and the previous video position, indicating the displacement or relative distance of the video part between the selected current input frame and previous input frame. In this embodiment, the output frame rate is twice the input frame rate. Therefore, each input frame (as the current input frame) may be used to generate 2 output frames through interpolation based on appropriate arrangement of phase coefficients. The previous input frame is usually selected from the last input frame of the previous frame group. For example, as for the current input frames B1 and B2, the previous input frame may be the last input frame A2 of the frame group A; as for the current input frames C1 and C2, the previous input frame may be the last input frame B2 of the frame group B.

As shown in Table 1, the relative distance of the video part between the selected current input frame and previous input frame is not a constant value under the rule of taking the previous and current input frames. For example, the calculated position difference values are 10, 10, 20, 20, 10, 10, 20, 20 . . . . This is because the rule of taking the input frames is only based on the film part, while the video part moves in every input frame. The inconsistent position difference values may cause inaccurate temporal MV candidate(s) in the video part.

In order to solve this problem, the ME unit 204 may multiply the temporal MV candidate (s) by a gain determined based on the position difference value when the block is determined to be a mixed block containing the video part. In an embodiment, the gain may be equal to the ratio of the current position difference value to the previous position difference value. For example, as shown in Table 1, the $1^{st}$ output frame is generated by taking the input frame B1 as the current input frame and taking the input frame A2 as the previous input frame, and the position difference value is 10. The $2^{nd}$ output frame is generated by taking the input frame B1 as the current input frame and taking the input frame A2 as the previous input frame, and the position difference value is 10. Therefore, the gain applied to the temporal MV candidates for the mixed block in the current input frame will be 1, which is the ratio of the current position difference value with respect to the $2^{nd}$ output frame to the previous position difference value with respect to the $1^{st}$ output frame. In addition, the $3^{rd}$ output frame is generated by taking the input frame B2 as the current input frame and taking the input frame A2 as the previous input frame, and the position difference value is 20. Therefore, the gain applied to the temporal MV candidates for the mixed block in the current input frame will be 2, which is the ratio of the current position difference value with respect to the $3^{rd}$ output frame to the previous position difference value with respect to the $2^{nd}$ output frame. In such a situation, during the ME operations, the temporal MV candidates for the mixed block may be multiplied by 2, so as to accurately represent the motion of the video part between the previous input frame and the current input frame.

Subsequently, the temporal MV candidates after modification are used as candidates for selecting the best MV. The ME unit 204 may determine the best MV for the mixed block from a plurality of MV candidates which include the temporal MV candidates (Step 314). The plurality of MV candidates may also include one or more spatial MV candidates and/or any other type of MV candidates. Among those MV candidates, only the temporal MV candidates are modified according to the position difference value. The best MV will be provided for the MC unit 206 to perform the MC operation.

Figure 6:
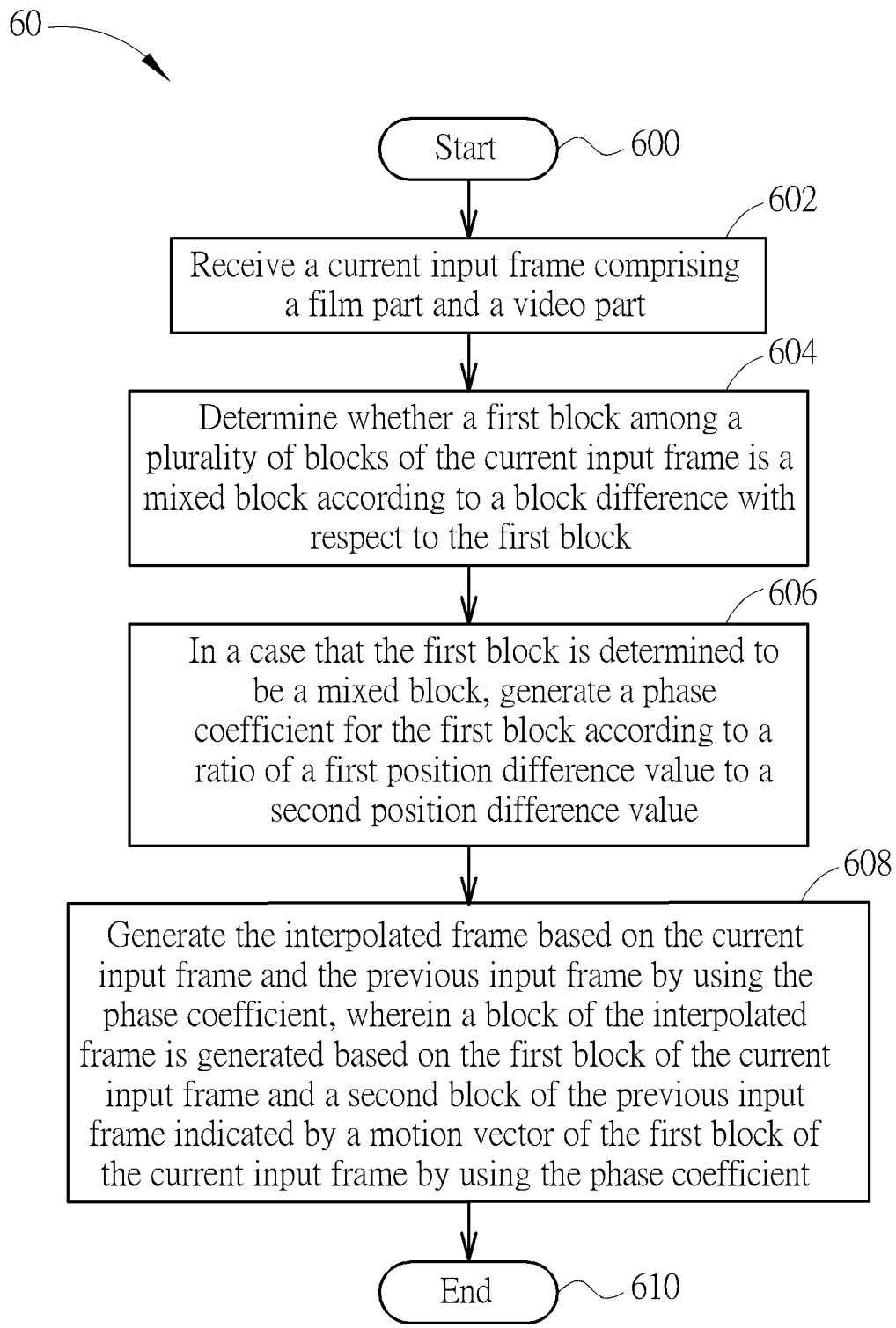
FIG. 6 is a flowchart of another image processing process according to an embodiment of the present invention.

Please refer to FIG. 6, which is a flowchart of another image processing process 60 according to an embodiment of the present invention. The image processing process 60 may be implemented in a video processor, such as the video processor 106 shown in FIGS. 1 and 2. As shown in FIG. 6, the image processing process 60 includes the following steps:

Step 600: Start.

Step 602: Receive a current input frame comprising a film part and a video part.

Step 604: Determine whether a first block among a plurality of blocks of the current input frame is a mixed block according to a block difference with respect to the first block.

Step 606: In a case that the first block is determined to be a mixed block, generate a phase coefficient for the first block according to a ratio of a first position difference value to a second position difference value.

Step 608: Generate the interpolated frame based on the current input frame and the previous input frame by using the phase coefficient, wherein a block of the interpolated frame is generated based on the first block of the current input frame and a second block of the previous input frame indicated by an MV of the first block of the current input frame by using the phase coefficient.

Step 610: End.

According to the image processing process 60, the video processor 106 receives the current input frame that may have a film part and a video part (Step 602), and also receives a previous input frame previous to the current input frame, where the previous input frame may also have a film part and a video part. After determining that the current input frame has a small-enough frame difference, the video processor 106 determines whether each block of the current input frame is a mixed block according to the block difference. In an embodiment, the mixed block detector 202 of the video processor 106 may determine whether a first block of the current input frame is a mixed block according to the block difference with respect to the first block (Step 604). The block difference indicates the difference between the first block of the current input frame and a corresponding block of the previous input frame at the same position as the first block. The calculation of the block difference may be realized by summing every difference between each pixel data of the first block of the current input frame and each pixel data of the corresponding block of the previous input frame at the same position. The related operations are illustrated in the above paragraphs and FIG. 5, and will not be narrated herein.

When the first block is determined to be the mixed block, the MC unit 206 of the video processor 106 may generate a phase coefficient for the first block according to the ratio of a first position difference value to a second position difference value (Step 606), where the first and second position difference values are determined based on the position of the video part. In this embodiment, the current input frame and the previous input frame are combined to generate an interpolated frame. The first position difference value may be the difference between the position of the video part in the interpolated frame and the position of the video part in the previous input frame, and the second position difference value may be the difference between the position of the video part in the current input frame and the position of the video part in the previous input frame.

As for a second block determined to be a non-mixed block where no video part or only few video part is included, the phase coefficient may be generated from a regular phase coefficient table calculated based on the cadence of the input frames and the input/output frame rates, and may have equal phase steps.

After determining the phase coefficient, the MC unit 206 thereby generates the interpolated frame based on the current input frame and the previous input frame by using the phase coefficient. More specifically, each block of the interpolated frame is generated based on a block (e.g., the first block) of the current input frame and a corresponding block of the previous input frame indicated by the MV of the block of the current input frame by using the phase coefficient (Step 608).

Figure 7:
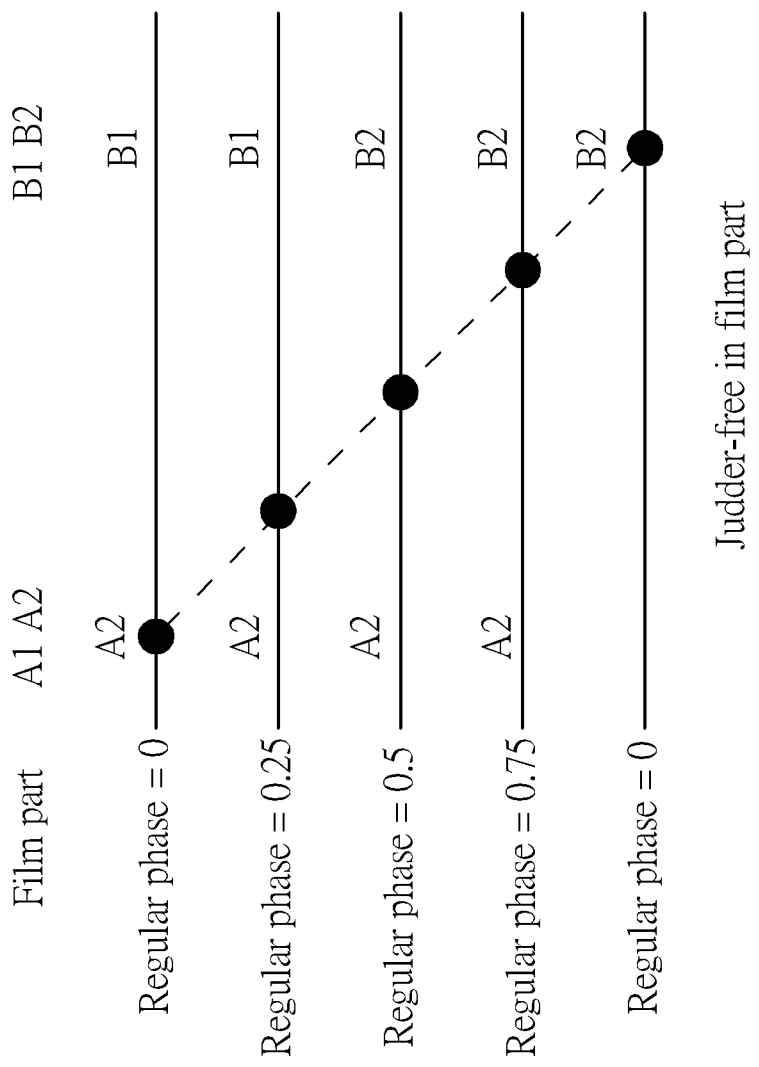
FIG. 7 is a schematic diagram of the combination of input frames to generate the interpolated frame with the regular phase coefficients and the motion of the film part.

Please refer to FIG. 7, which is a schematic diagram of the combination of input frames to generate the interpolated frame with the regular phase coefficients and the motion of the film part. In this embodiment, the film mode 22 is used and the output frame rate is twice the input frame rate. Therefore, each input frame is used to generate 2 output frames (or interpolated frames), and the regular phase coefficients are 0, 0.25, 0.5, 0.75 with a fixed phase step 0.25. For example, the current input frame B1 and the previous input frame A2 are combined to generate two interpolated frames with the phase coefficients 0 and 0.25, respectively. The current input frame B2 and the previous input frame A2 are combined to generate two interpolated frames with the phase coefficients 0.5 and 0.75, respectively. As shown in FIG. 7, the input frames A1 and A2 have similar images in the film part, and thus an object or image of the film part in the input frames A1 and A2 may be at the same position. Similarly, the input frames B1 and B2 have similar images in the film part, and thus an object or image of the film part in the input frames B1 and B2 may be at the same position. The interpolation based on the regular phase coefficients may generate a judder-free image in the film part, as shown in FIG. 7.

Figure 8:
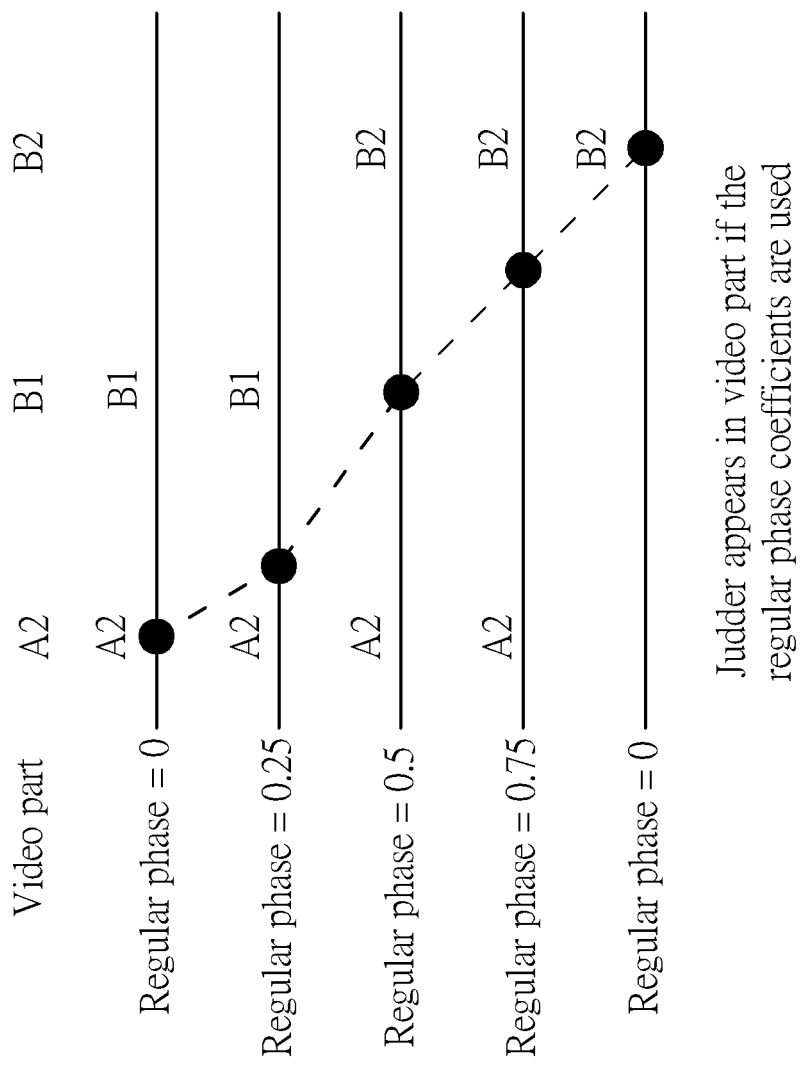
FIG. 8 is a schematic diagram of the combination of input frames to generate the interpolated frame with the regular phase coefficients and the motion of the video part.

However, if the regular phase coefficients are applied to the video part, a judder may appear. Please refer to FIG. 8, which is a schematic diagram of the combination of input frames to generate the interpolated frame with the regular phase coefficients and the motion of the video part. As shown in FIG. 8, the position of the video part is different in each input frame, where an object of the video part may move toward the same direction with a fixed speed, so that the displacement between the input frames A2 and B1 is identical to the displacement between the input frames B1 and B2. In such a situation, if the regular phase coefficients 0, 0.25, 0.5, 0.75 are used, a judder may appear in the video part. That is, the interpolation based on the regular phase coefficients will cause an inconsistency on the movement speed of the video part in the interpolated frame.

In order to solve this problem, the MC unit 206 may calculate a mixed phase coefficient for the mixed block containing the video part. The mixed phase coefficient may be generated according to the position difference value. An exemplary method for generating the mixed phase coefficient is shown in Table 2 as follows:

TABLE 2

| Previous input frame | Current input frame | Regular phase | Previous video position | Current video position | Interpolated video position | Mixed phase |
|---|---|---|---|---|---|---|
| A2 | B1 | 0 | 10 | 20 | 10 | 0 |
| A2 | B1 | 0.25 | 10 | 20 | 15 | 0.5 |
| A2 | B2 | 0.5 | 10 | 30 | 20 | 0.5 |
| A2 | B2 | 0.75 | 10 | 30 | 25 | 0.75 |
| B2 | C1 | 0 | 30 | 40 | 30 | 0 |
| B2 | C1 | 0.25 | 30 | 40 | 35 | 0.5 |
| B2 | C2 | 0.5 | 30 | 50 | 40 | 0.5 |
| B2 | C2 | 0.75 | 30 | 50 | 45 | 0.75 |

The scenario of Table 2 is identical to Table 1, where the cadence indicates the film mode 22 and the output frame rate is twice the input frame rate. Table 2 also specifies the position of the video part in the previous input frame in the field "Previous video position" and specifies the position of the video part in the current input frame in the field "Current video position". In addition, the field "Interpolated video position" refers to the position of the video part in the interpolated frame. The mixed phase may be obtained based on the current video position, previous video position and the interpolated video position.

In order to determine the position of the video part in the interpolated frame, the MC unit 206 of the video processor 106 may calculate the video step. The video step refers to the movement or displacement of the video part in each interpolated frame, and the video step may be a fixed value, which indicates that the video part (such as the scrolling text) moves at a constant speed. In detail, the video step is calculated by dividing a position difference by the number of interpolated frames, where the position difference is the difference of the position of the video part in the last frame of the current frame group to which the current input frame belongs to and the position of the video part in a frame of the previous frame group previous to the current frame group, and the number of interpolated frames is determined according to the output frame rate and the input frame rate of the video processor 106.

In this embodiment, each input frame (as the current input frame) is used to generate 2 output frames through interpolation, and the film mode 22 indicates that each frame group has 2 input frames. Therefore, the image in a frame group may be used to generate 4 interpolated frames; hence, the number of interpolated frames will be 4. When the frame groups A and B are combined to generate the interpolated frames, the position of the video part in the last frame of the current frame group may be the video position of the input frame B2, which is compared with the position of the video part in a frame of the previous frame group A for determining the position difference. Since the previous frame is usually taken from the last frame of the previous frame group, i.e., the input frame A2, the position of the video part in the frame of previous frame group A may be the video position of the input frame A2. Therefore, the position difference may equal 20, which is the video position of the input frame B2, 30, minus the video position of the input frame A2, 10. As a result, since the position difference equals 20 and the number of interpolated frames is 4, the video step will be 5.

In such a situation, the position of the video part in the current interpolated frame may be calculated by adding the video step 5 to the position of the video part in the previous frame, which may be the previous input frame or the previous interpolated frame. As shown in Table 2, the video position in a series of interpolated frames will be 10, 15, 20, 25, 30, 35, 40, and 45 . . . with the phase step 5.

Subsequently, the MC unit 206 may calculate the mixed phase coefficient according to the current video position, previous video position and the interpolated video position. In detail, the mixed phase coefficient may be equal to the ratio of the interpolated position difference value to the current position difference value, where the interpolated position difference value is the difference between the position of the video part in the interpolated frame and the position of the video part in the previous input frame, and the current position difference value is the difference between the position of the video part in the current input frame and the position of the video part in the previous input frame. The mixed phase coefficient, which may be different from the regular phase coefficient, is applied to those blocks determined to be the mixed block containing the video part.

Figure 9:
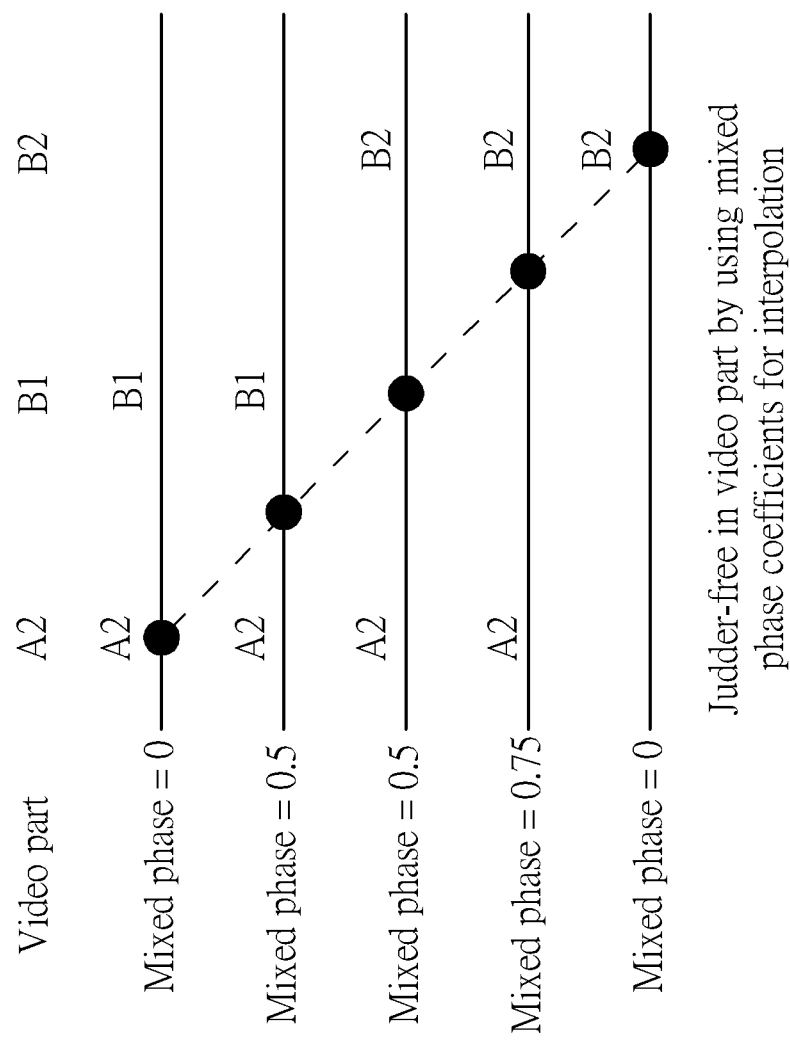
FIG. 9 is a schematic diagram of the combination of input frames to generate the interpolated frame with the mixed phase coefficients and the motion of the video part.

For example, in Table 2, the interpolated frame of the $2^{nd}$ row is generated by taking the input frame B1 as the current input frame and taking the input frame A2 as the previous input frame, and the current position difference value is 10 and the interpolated position difference value is 5. Therefore, the mixed phase coefficient for the interpolated frame is 0.5, which is different from the regular phase coefficient 0.25 determined based on the cadence. In the similar manner, the mixed phase coefficients for a series of interpolated frames may be 0, 0.5, 0.5 and 0.75. The mixed phase coefficients may be used for the interpolation performed on the mixed blocks, so as to generate a judder-free image in the video part. As shown in FIG. 9, the video part may move smoothly in a series of interpolated frames if the mixed phase coefficients are used.

Please note that the present invention aims at providing an MEMO method for the mixed-mode image frame having the video part and the film part. Those skilled in the art may make modifications and alterations accordingly. For example, in the above embodiments, the film mode 22 is taken as an example to facilitate the illustrations. In another embodiment, the MEMO method of the present invention is applicable to another film mode such as 32, and also applicable to different output frame rates. As long as the video processor may determine whether an image block is a mixed block containing the image content of the video part and perform ME and/or MC on this image block based on different manners with respect to the mixed block and the non-mixed block, the related ME and/or MC operations should belong to the scope of the present invention.

To sum up, the present invention provides a novel MEMC method and a video processor used for the mixed-mode image frame, of which the video part and the film part apply different ME operations and MC operations. The film part may be a background film and the video part may be a scrolling text video overlapping the background film. Since the film part is input following the cadence and the video part moves with a constant speed in a series of input frames, the conventional MEMC operations may not be able to cancel the judders on both the film part and the video part and make both parts smooth. The present invention can deal with both the film part and the video part to generate a judder-free image.

First, the video processor determines whether each image block in the input frame is a mixed block containing the image content of the video part. If yes, the temporal MV candidates for the image block are multiplied by a gain which is determined based on the position difference value of the video part. The ME unit thereby selects the best MV for the image block from multiple MV candidates among which the temporal MV candidates have been modified with the gain, and then sends the selected best MV to the MC unit. The MC unit applies the mixed phase coefficients to perform interpolation to generate the interpolated frames, to appropriately cancel the judders and make the video part smooth, where the mixed phase coefficients are determined based on the position difference value of the video part. Otherwise, if the image block is determined to be not a mixed block, the ME unit may not modify the temporal MV candidates, and the MC unit may apply the regular phase coefficients to perform interpolation, where the regular phase coefficients are generated based on the cadence of the input frames and the input/output frame rates.

As a result, the video processor of the present invention may correctly predict the block motion in both the film part and the video part during the ME and MC procedures, so as to cancel the unwanted judders and improve the image quality in the mixed-mode video.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of motion estimation for a video processor, comprising:

receiving a current input frame comprising a film part and a video part;

calculating a frame difference between the current input frame and a previous input frame which is previous to the current input frame;

comparing the frame difference and a first threshold to generate a comparison result;

in response to that the comparison result indicates the frame difference is less than the first threshold, determining whether a first block among a plurality of blocks of the current input frame is a mixed block according to a block difference with respect to the first block, wherein the block difference indicates a difference between the first block of the current input frame and a block of the previous input frame at the same position as the first block;

generating at least one temporal motion vector candidate for the first block;

modifying the at least one temporal motion vector candidate for the first block according to a current position difference value of the video part in the current input frame when the first block is determined to be the mixed block; and determining a motion vector for the first block from a plurality of motion vector candidates which comprise the at least one temporal motion vector candidate.

2. The method of claim 1, further comprising:

generating an interpolated frame based on the current input frame and the previous input frame by using a phase coefficient with respect to the current input frame, wherein a block of the interpolated frame is generated based on the first block of the current input frame and a second block of the previous input frame indicated by the motion vector for the first block of the current input frame by using the phase coefficient.

3. The method of claim 2, wherein in a case that the first block is determined to be a mixed block, the phase coefficient is generated according to a ratio of a first position difference value to the current position difference value, and wherein the first position difference value is a difference between a position of a video part in the interpolated frame and a position of a video part in the previous input frame, and the current position difference value is a difference between a position of the video part in the current input frame and the position of the video part in the previous input frame.

4. The method of claim 1, wherein the step of modifying the at least one temporal motion vector candidate for the first block according to the current position difference value of the video part in the current input frame comprises:
modifying the at least one temporal motion vector candidate for the first block by multiplying each of the at least one temporal motion vector by a gain determined according to the current position difference value and a previous position difference value of a video part in the previous input frame.

5. The method of claim 4, wherein the gain is equal to a ratio of the current position difference value to the previous position difference value, wherein the current position difference value is a difference value between a position of the video part in the current input frame and a position of the video part in the previous input frame with respect to a current output frame, and the previous position difference value is a difference value between a position of the video part in the current input frame and a position of the video part in the previous input frame with respect to a previous output frame previous to the current output frame.

6. The method of claim 1, wherein the at least one temporal motion vector candidate is without being modified when the first block is determined to be not a mixed block.

7. The method of claim 1, wherein the step of determining whether the first block among the plurality of blocks of the current input frame is the mixed block according to the block difference with respect to the first block comprises:
calculating the block difference with respect to the first block by summing every difference between each pixel data of the first block of the current input frame and each pixel data of the block of the previous input frame at the same position as the first block;
determining a block mix level according to the block difference with respect to the first block; and
comparing the block mix level with a second threshold to determine whether the first block is the mixed block.

8. A video processor, configured to perform the following steps:
receiving a current input frame comprising a film part and a video part;
calculating a frame difference between the current input frame and a previous input frame which is previous to the current input frame;
comparing the frame difference and a first threshold to generate a comparison result;
in response to that the comparison result indicates the frame difference is less than the first threshold, determining whether a first block among a plurality of blocks of the current input frame is a mixed block according to a block difference with respect to the first block, wherein the block difference indicates a difference between the first block of the current input frame and a block of the previous input frame at the same position as the first block;
generating at least one temporal motion vector candidate for the first block;
modifying the at least one temporal motion vector candidate for the first block according to a current position difference value of the video part in the current input frame when the first block is determined to be the mixed block; and
determining a motion vector for the first block from a plurality of motion vector candidates which comprise the at least one temporal motion vector candidate.

9. The video processor of claim 8, wherein the video processor is further configured to generate an interpolated frame based on the current input frame and the previous input frame by using a phase coefficient with respect to the current input frame, wherein a block of the interpolated frame is generated based on the first block of the current input frame and a second block of the previous input frame indicated by the motion vector for the first block of the current input frame by using the phase coefficient.

10. The video processor of claim 9, wherein in a case that the first block is determined to be a mixed block, the phase coefficient is generated according to a ratio of a first position difference value to the current position difference value, and wherein the first position difference value is a difference between a position of a video part in the interpolated frame and a position of a video part in the previous input frame, and the current position difference value is a difference between a position of the video part in the current input frame and the position of the video part in the previous input frame.

11. The video processor of claim 8, wherein the step of modifying the at least one temporal motion vector candidate for the first block according to the current position difference value of the video part in the current input frame comprises:
modifying the at least one temporal motion vector candidate for the first block by multiplying each of the at least one temporal motion vector by a gain determined according to the current position difference value and a previous position difference value of a video part in the previous input frame.

12. The video processor of claim 11, wherein the gain is equal to a ratio of the current position difference value to the previous position difference value, wherein the current position difference value is a difference value between a position of the video part in the current input frame and a position of the video part in the previous input frame with respect to a current output frame, and the previous position difference value is a difference value between a position of the video part in the current input frame and a position of the video part in the previous input frame with respect to a previous output frame previous to the current output frame.

13. The video processor of claim 8, wherein the at least one temporal motion vector candidate is without being modified when the first block is determined to be not a mixed block.

14. The video processor of claim 8, wherein the step of determining whether the first block among the plurality of blocks of the current input frame is the mixed block according to the block difference with respect to the first block comprises:
calculating the block difference with respect to the first block by summing every difference between each pixel data of the first block of the current input frame and each pixel data of the block of the previous input frame at the same position as the first block;

determining a block mix level according to the block difference with respect to the first block; and comparing the block mix level with a second threshold to determine whether the first block is the mixed block.

15. A method of motion compensation for a video processor, comprising:

receiving a current input frame comprising a film part and a video part;

determining whether a first block among a plurality of blocks of the current input frame is a mixed block according to a block difference with respect to the first block, wherein the block difference indicates a difference between the first block of the current input frame and a block of a previous input frame at the same position as the first block;

in a case that the first block is determined to be a mixed block, generating a phase coefficient for the first block according to a ratio of a first position difference value to a second position difference value, wherein the first position difference value is a difference between a position of a video part in an interpolated frame and a position of a video part in the previous input frame, and the second position difference value is a difference between a position of the video part in the current input frame and the position of the video part in the previous input frame; and generating the interpolated frame based on the current input frame and the previous input frame by using the phase coefficient, wherein a block of the interpolated frame is generated based on the first block of the current input frame and a second block of the previous input frame indicated by a motion vector of the first block of the current input frame by using the phase coefficient.

16. The method of claim 15, wherein the motion vector is selected from a plurality of motion vector candidates which comprise at least one temporal motion vector candidate, and the at least one temporal motion vector candidate is modified according to the second position difference value.

17. The method of claim 15, further comprising:

calculating a frame difference between the current input frame and the previous input frame;

comparing the frame difference and a first threshold to generate a comparison result; and determining whether the first block is the mixed block in response to that the comparison result indicates the frame difference is less than the first threshold.

18. The method of claim 15, further comprising:

calculating a video step by dividing a difference of a position of a video part in a last frame of a current frame group to which the current input frame belongs and a position of a video part in a frame of a previous frame group previous to the current frame group by the number of interpolated frames determined according to an output frame rate and an input frame rate of the video processor; and adding the video step to the position of the video part in a previous frame to obtain the position of the video part in the interpolated frame.

19. The method of claim 15, wherein the step of determining whether the first block among the plurality of blocks of the current input frame is the mixed block according to the block difference with respect to the first block comprises:

calculating the block difference with respect to the first block by summing every difference between each pixel data of the first block of the current input frame and each pixel data of the block of the previous input frame at the same position as the first block;

determining a block mix level according to the block difference with respect to the first block; and comparing the block mix level with a second threshold to determine whether the first block is the mixed block.

20. A video processor, configured to perform the following steps:

receiving a current input frame comprising a film part and a video part;

determining whether a first block among a plurality of blocks of the current input frame is a mixed block according to a block difference with respect to the first block, wherein the block difference indicates a difference between the first block of the current input frame and a block of a previous input frame at the same position as the first block;

in a case that the first block is determined to be a mixed block, generating a phase coefficient for the first block according to a ratio of a first position difference value to a second position difference value, wherein the first position difference value is a difference between a position of a video part in an interpolated frame and a position of a video part in the previous input frame, and the second position difference value is a difference between a position of the video part in the current input frame and the position of the video part in the previous input frame; and generating the interpolated frame based on the current input frame and the previous input frame by using the phase coefficient, wherein a block of the interpolated frame is generated based on the first block of the current input frame and a second block of the previous input frame indicated by a motion vector of the first block of the current input frame by using the phase coefficient.

21. The video processor of claim 20, wherein the motion vector is selected from a plurality of motion vector candidates which comprise at least one temporal motion vector candidate, and the at least one temporal motion vector candidate is modified according to the second position difference value.

22. The video processor of claim 20, wherein the video processor is further configured to perform the following steps:

calculating a frame difference between the current input frame and the previous input frame;

comparing the frame difference and a first threshold to generate a comparison result; and determining whether the first block is the mixed block in response to that the comparison result indicates the frame difference is less than the first threshold.

23. The video processor of claim 20, wherein the video processor is further configured to perform the following steps:

calculating a video step by dividing a difference of a position of a video part in a last frame of a current frame group to which the current input frame belongs and a position of a video part in a frame of a previous frame group previous to the current frame group by the number of interpolated frames determined according to an output frame rate and an input frame rate of the video processor; and adding the video step to the position of the video part in a previous frame to obtain the position of the video part in the interpolated frame.

24. The video processor of claim 20, wherein the step of determining whether the first block among the plurality of blocks of the current input frame is the mixed block according to the block difference with respect to the first block comprises:
calculating the block difference with respect to the first block by summing every difference between each pixel data of the first block of the current input frame and each pixel data of the block of the previous input frame at the same position as the first block;
determining a block mix level according to the block difference with respect to the first block; and
comparing the block mix level with a second threshold to determine whether the first block is the mixed block.

\* \* \* \* \*